June 11, 1963

J. HICKEN 3,093,793

INSULATION TESTING APPARATUS

Filed June 20, 1961

INVENTOR.
JAMES HICKEN
BY
ATTORNEY

United States Patent Office 3,093,793
Patented June 11, 1963

3,093,793
INSULATION TESTING APPARATUS
James Hicken, Chenango Bridge, N.Y.
(7 Elizabeth St., M.R. 97, Binghamton, N.Y.)
Filed June 20, 1961, Ser. No. 118,310
5 Claims. (Cl. 324—54)

This invention relates to a method and apparatus for testing the insulation resistance of materials, particularly for the testing of apparel worn as protection against electrical shock by men working on high tension electrical wiring or equipment.

The safety of personnel operating electrical equipment, particularly those engaged in the repair of high tension distribution lines, depends on the adequate insulating property of apparel such as gloves, sleeves, etc., which are worn when they perform their duties. Such protecting apparel is generally made of rubber which, aside from high insulating properties, affords the flexibility necessary for the handling of tools and other equipment. However, other synthetic plastic materials have the required dielectric properties and these may also be employed for the purpose. Whatever the material used, it is important to make certain that it has no minute defects, macroscopically undetectable, which impair its guardian qualities. A tiny pin hole or a variation in thickness may be sufficient to endanger the person wearing it, for it may cause a breakdown of the insulation, resulting in electrical shock.

It is, therefore, necessary to provide satisfactory means for testing such materials under controlled conditions by subjecting it to an electrical stress above that to which it is normally exposed. The testing is generally effected by the manufacturer prior to shipment of the safety apparel. However, it is also important that a simple, adequate method and apparatus of testing be available to the user for frequent examination of such apparel in order to determine whether any deterioration has occurred during its use.

It is, therefore, a primary object of the invention to provide a reliable and easily performable method of testing the insulating properties of protective apparel.

It is a further object of this invention to provide an apparatus of simple construction to perform the above testing method.

It is a particular feature of the invention that no liquid is employed as an electrolytic surface contacting medium, nor is it necessary to deform the material under test into any other shape than its original, normally applicable form.

Other objects and features will be apparent from the following description of the invention, pointed out in particularity in the appended claims, and taken in connection with the accompanying drawing, in which:

Figure 1:
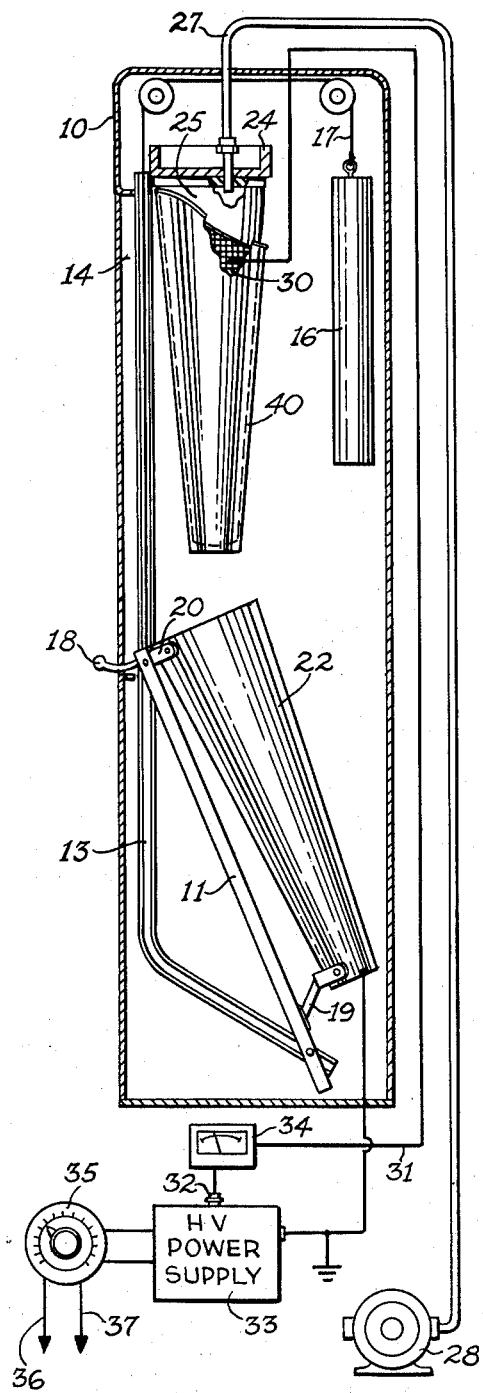
FIG. 1 is a schematic, side elevational, sectional view of the apparatus, in accordance with the invention, illustrated, by way of example, for the testing of protecting sleeves worn by linemen.

The apparatus shown in the figures is, by way of example, designed for the testing of linemen's sleeves. Accordingly, the electrode configurations, particularly that of the solid outer metallic electrode, follow the normal shape of this protecting garment. Other types of protective covering can also be tested by the method described herein with slight modification of the apparatus so as to conform the electrodes to the shape of the garment as originally worn.

In prior art methods of testing, liquid electrodes are utilized in order to insure uniform surface contact. For example, in the testing of linemen's gloves, a tank filled with conducting liquid is provided. The glove is also filled with a similar liquid and inserted into the tank. The test potential is applied between the liquid inside the glove and the one outside the glove. This process, while cumbersome, is not difficult to perform with such garments which are closed and able to hold the liquid. However, linemen's sleeves have open ends and cannot be filled with liquid. The sleeve has to be deformed by folding it over itself to form a ring-like container for the liquid. This practice has certain disadvantages in that at the point where the material is deformed, the test conditions are not the same as at other parts. Moreover, any deforming of the material which is not encountered in normal use may cause faults to develop at a later date and is subject to corona cutting at the point of deformation. It is, therefore, desirable to test protective material in its normal or relaxed condition. The present invention allows such testing and eliminates the need for deforming the article to be tested as well as the use of liquid electrodes.

Essentially, the invention encompasses a method and apparatus for testing the insulating property of deformable apparel used in the protection of persons against contact with high voltage conductors, and consists of the insertion of such an apparel into a solid conducting outer electrode which has the configuration of the apparel as it is used in normal application, in other words, without deforming the shape and contour of such an apparel. An expandable, flexible conducting lining is placed in such a manner as to contact the inner walls of the apparel, and is adapted to conform, by expansion, to the volumetric configuration thereof. An inflatable insulating inner support is then placed within the conducting lining so as to expand the latter when inflated and constrain the apparel to firm contact with the inner walls of the outer supporting electrode. An electric potential of predetermined magnitude is then applied between the outer support and the inner lining and the leakage current indicated by a suitable instrument.

Referring to the drawing, the apparatus consists essentially of a housing or frame 10, which forms an enclosure so that all the components are protected when in use and thereby reduce the hazards encountered by the use of high voltages. A door panel 11 is slidably arranged in the runners 13 affixed to the housing 10 so that in the position shown in FIG. 1, it rests on the bottom of the housing 10, permitting free access to the inside thereof through the opening 14. The door panel 11 is counterbalanced by the weight 16 attached to the rope 17 so that the panel 11 may be retained in any desired position. The other end of the rope 17 is attached to the panel near the handle 18.

Behind the panel 11 and supported thereon by means of brackets 19 and 20, is a solid conductor in the form of a shell 22, which conforms to the shape and size of the article to be tested. In the present instance, the shell 22 is in the form of a lineman's sleeve, since the object is to test this type of protective covering for its insulating quality. It is to be noted that the shell 22 is proportioned to fit a lineman's sleeve accurately, in other words, it is so dimensioned that when a sleeve is inserted therein and expanded into its normal shape, every incremental surface thereof will be in contact with the inner wall of the shell 22.

Within the housing 10, and near the opening 14, is a disc-shaped support 24, to which is attached an inflatable bag 25 of suitable material, such as canvas or rubber, having the required dielectric properties to withstand the potential difference of the applied electric energy. A pressure pipe 27 fits into the support 24 and terminates in an air pump 28. A flexible conducting lining 30 having the general configuration of the material to be tested is placed over the bag 25 and an electric conductor 31 is attached thereto, which leads to terminal 32 of the high voltage power supply 33. An indicating instrument, such as a milliammeter 34, may be placed in series with the conductor 31. The other terminal of the power supply 33 is attached to the housing 10 and is also grounded. The power supply 33 is preferably of the direct current type, although in some testing applications alternating current may be used. The output voltage of the supply may be varied by any suitable manner, shown here, by way of example, by the variable transformer 35 connected to the supply lines 36 and 37.

The lineman's sleeve 40 to be tested is placed over the flexible lining 30 as seen in FIGURE 1 and held there by air pressure applied by means of the pump 28, which inflates the bag 25. When the sleeve 40 is properly oriented over the assembly consisting of the bag 25 and inner lining 30, the panel 11 is moved up by the handle 18, thereby placing the shell 22 over the sleeve 40. The bag 25 is then inflated to a higher pressure so as to force the inner lining 30 and the sleeve 40 to expand into the shell 22. A firm contact is thus established between the conducting lining 30 and the inner wall of the sleeve 40 and between the shell 22 and the outer wall of the sleeve 40.

Figure 2:
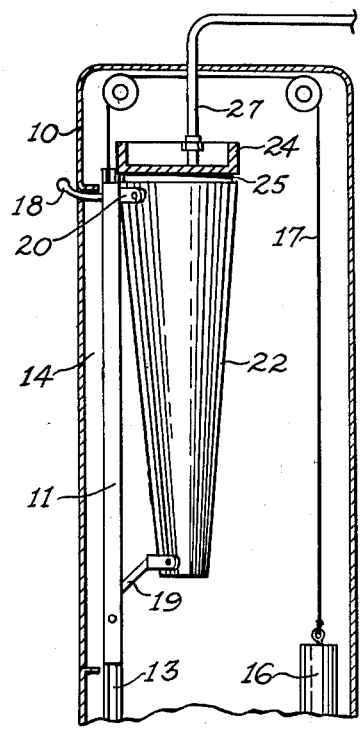
FIG. 2 is a partial view of the apparatus in closed position.

FIGURE 2 shows the shell 22 placed over the assembly with the door panel in closed position. Inner lining electrode 30 is, of course, so dimensioned as to be slightly shorter than the sleeve 40 to be tested, thereby preventing arcing to the shell 22.

Figure 3:
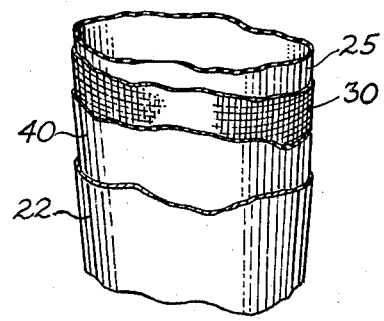
FIG. 3 is a perspective view of the arrangement of the conducting electrodes surrounding the sleeve to be tested with portions of each cut away for clearer illustration.

A relative placement of the various electrodes and the sleeve to be tested is shown in FIGURE 3, with the bag 25 in inflated condition. It is seen that the inner electrode 30 is in tight contact with the inner side of the sleeve 40 and, the outer side thereof, with the inner wall of the shell 22.

The inner electrode 30 is preferably made of conducting rubber. However, it may be woven fabric with conducting wires woven in one direction and non-conducting fibre, such as cotton, in the other direction. In this manner, the conducting wires would be run along the length of the sleeve to be tested and the cotton threads around it.

To perform the electrical testing of the lineman's sleeve, the latter is slipped over the inner electrode assembly and oriented properly lengthwise and rotationalwise. Since the electrode is compressed when not inflated, this step is easily performed. The outer electrode 22 is then placed over the sleeve 40. Air is forced into the bag 25, causing the inner electrode to come into close contact with the sleeve and the latter in close contact with the outer electrode, all without bending or deforming the rubber sleeve. A high voltage, either A.C. or D.C., is applied between the two electrodes, placing the rubber sleeve under electrical stress. This voltage remains on for a prescribed time. If the sleeve fails under test, an increased electrical current will be indicated on the meter 34. After the test is performed, the power supply is deenergized, the shell 22 lowered, and the sleeve 40 removed from the suspended inner electrode 30. Suitable electrical interlocks, not shown here, are provided for automatic release of the power when the door panel 11 is lowered.

In a practical use of the method described above, satisfactory results have been obtained by utilizing alternating current of at least 10 kv. R.M.S. with a duration of application of this voltage for at least three minutes.

Similarly, pursuing the above testing procedure with the use of direct current, it was found that satisfactory results were obtained by applying at least 10 kv. for a duration of at least three minutes.

What is claimed is:

1. The method of testing the insulating property of deformable apparel used in protection of persons against contact with high voltage conductors which comprises, inserting said apparel in a solid conducting outer support having the configuration of said apparel in its normal application, placing an expandable, flexible conducting lining within said apparel, said lining being adapted to conform to the volumetric configuration of said apparel, placing an inflatable insulating inner support within said lining, inflating said inner support to expand said lining and thereby to constrain said apparel into firm contact with the inner walls of said outer support, applying an electrical potential of predetermined magnitude between said outer support and said lining, and indicating the leakage current.

2. The method of testing in accordance with claim 1 wherein said electrical potential is alternating current of at least 10 kv. R.M.S. and the duration of application of said voltage is at least three minutes.

3. The method of testing in accordance with claim 1 wherein said electrical potential is direct current of at least 7 kv. and the duration of application of said voltage is at least three minutes.

4. In an apparatus for testing the insulating property of deformable apparel used in the protection of persons against contact with high voltage conductors, a solid conducting shell having the general configuration of said apparel and adapted to hold said apparel therewithin, a flexible, expandable conducting lining adapted to be inserted in said apparel and having the volumetric configuration thereof when expanded, a frame, means for removably supporting said apparel within said frame, means for fixably supporting said lining within said frame, an inflatable member within said lining and means for inflating said member whereby upon inflation thereof said lining is expanded within said apparel and constraining said apparel to expand against the inner walls of said shell and into firm electrical contact therewith, a high voltage power supply, a circuit interconnecting one terminal of said supply with said shell and the other terminal with said lining and means for indicating the leakage current in said circuit.

5. Apparatus in accordance with claim 4 wherein said frame is in the form of an enclosure having walls defining an opening, a sliding door panel covering said opening when closed, said shell being mounted to the inner side of said panel, a support for said lining within said housing and near said opening for easy access thereof, guides for sliding said door panel, said guides being so dimensioned as to place said shell over said lining upon closure of said door panel.

References Cited in the file of this patent

UNITED STATES PATENTS

| | | |
|---|---|---|
| 2,497,804 | Stearns | Feb. 14, 1950 |
| 2,649,960 | Gammeter | Aug. 25, 1953 |
| 2,956,258 | Raddin | Oct. 11, 1960 |
| 2,978,666 | McGregor | Apr. 4, 1961 |
| 2,981,886 | Beck | Apr. 25, 1961 |